May 30, 1939. E. C. HORTON 2,160,736
WINDOW WIPER
Filed Jan. 20, 1936
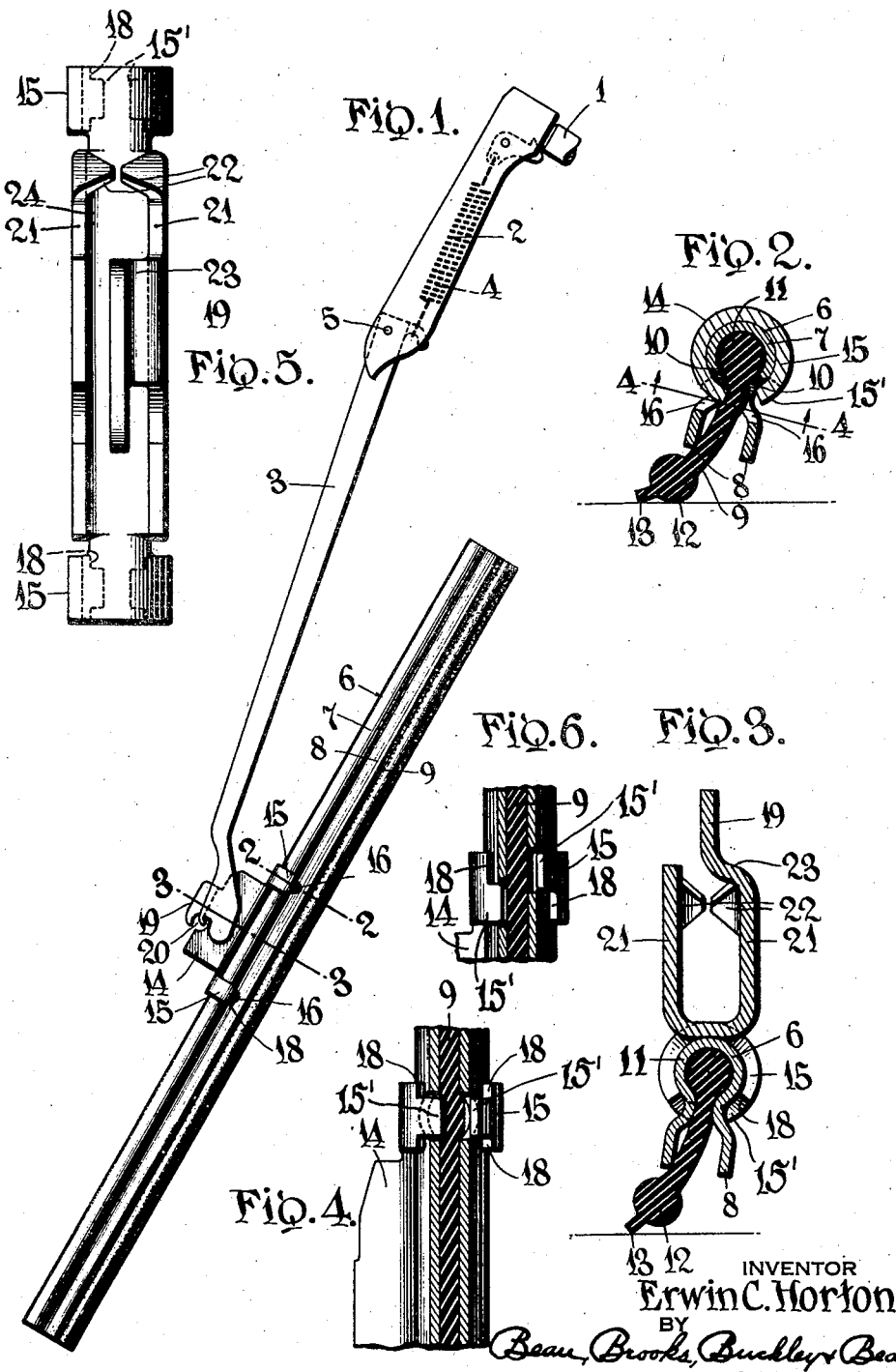
INVENTOR
Erwin C. Horton,
BY
Bean, Brooks, Buckley & Bean.
ATTORNEYS Patented May 30, 1939

2,160,736

UNITED STATES PATENT OFFICE 2,160,736

WINDOW WIPER

Erwin C. Horton, Hamburg, N. Y., assignor to Trico Products Corporation, Buffalo, N. Y.

Application January 20, 1936, Serial No. 59,947

15 Claims. (Cl. 15—250)

This invention relates to a windshield wiper, or wiper blade, as it is frequently referred to in commerce, and it has for its object to provide a wiper in which a firm wiping contact may be obtained with the glass to insure a more thorough cleaning thereof, and further to provide a wiper which will have a longer period of usefulness.

Wiper blades now in use are each provided with a rigidly carried clip by which it is attached to its carrying arm in a manner to permit the blade to drag at an incline over the glass, the same changing its inclination at the beginning of each wiper stroke. The attaching clip or device acts solely as such.

The present invention comprehends a wiper in which its attaching clip is movably connected thereto for acting in a secondary capacity as a means for pressing the rubber wiping strip, which forms a part of the wiper, directly against the glass surface. It further comprehends a construction in which the wiper is urged to a position when at rest normal to the window surface, to avoid the rubber wiping edge becoming set in a deformed position.

In the drawing

Fig. 1 is a side elevation of a wiper carrying arm supporting a wiper constructed in accordance with the present invention;

Figs. 2 and 3 are transverse sectional views taken respectively on lines 2—2 and 3—3 of Fig. 1;

Fig. 4 is a longitudinal transverse sectional view taken about on line 4—4 of Fig. 2;

Fig. 5 is a plan view of the attaching clip, per se; and

Fig. 6 shows a modified construction.

Referring more particularly to the drawing, the numeral 1 designates a wiper actuating shaft to which the wiper arm is attached, the inner section 2 of the arm being shown as rigidly attached thereto and pivotally supporting at its free end the outer arm section 3. The outer end of the arm is urged toward the window or windshield glass by a spring 4 tending to swing the arm section 3 about its pivotal mounting 5.

The wiper blade comprises a channeled metal or rigid holder 6, the base of the channel being shaped, as indicated at 7, to firmly anchor the rubber wiper strip 9, while the outer marginal portions 8 of the sides of the channel are spaced outwardly to permit free flexing of the wiping strip from the point of embrace as defined by the shoulders 10. The strip is provided with an anchor bead 11 which is firmly embraced by the cylindrical portion 7 so that the body of the strip may readily flex from side to side outwardly beyond the shoulders 10. The wiping edge portion of the strip-like body 9 is provided with a cylindrical bead 12 which latter carries an outwardly extending lapping edge 13.

The blade attaching clip 14 is connected to the blade for movement with respect thereto. According to the present construction, this relative movement is pivotal, and to this end the clip is mounted on the bead anchoring portion 7 of the holder for movement about the longitudinal axis of such portion which latter may be cylindrical. The clip may be provided, as herein illustrated, with anchor straps 15 which conform to the cylindrical contour of its supporting portion 7, with sufficient looseness in their embrace therewith to permit the clip to slide circumferentially thereabout. These anchor straps 15 may be struck out from the side walls of the sheet metal clip 14, or otherwise formed, and the sides of the holder 6 are provided with openings 16 which expose the rubber body 9 outwardly beyond its anchoring bead 11, to contact by the free terminals 15' of the anchor straps. This interengagement between the anchor straps and the channeled holder functions to definitely locate the clip on the blade while permitting the latter to assume the desired inclination as it moves on the glass. However, any rocking of the blade in the clip will be against the effort of the resilient body 9 which latter tends to hold the blade upright on the glass. The strap terminals will thus be resisted against circumferential movement about the cylindrical portion 7 away from a normal position thereon. The openings 16 may be directly opposite as shown in Fig. 4, wherein the rubber material may be forced into the opposite opening by the anchor straps, or said openings 16 may be more or less offset so that the rubber will have a substantial backing, as provided by the opposite side of the marginal portions 8 as shown in Figure 6.

For instance, in the sectionalized views of the drawing, the wiper blade, while assuming a dragging position, is being resisted increasingly against swinging in a clockwise direction within the pivotal grasp of the anchor straps 15, the terminals of the straps on one side of the clip embedding themselves in the soft rubber body of the wiping strip, while the opposing ends 15' are shown slightly withdrawn from such resilient body. Preferably, the terminals of the anchor straps have such bearing contact with the rubber body 9 as to tend to urge the blade to a normal or upright position with respect to the window surface being acted upon. This will largely avoid a distorted setting of the rubber wiping edge over to one side.

In order to fix positively the extreme angle of inclination of the blade with respect to the clip, the anchor straps 15 may be provided with shoulders 18 which are adapted to abut against the marginal portions about the openings 16 and thereby arrest the penetration of the strap terminals into the yielding body portion 9.

The formation of the clip for attachment to the arm may be of any approved form, that herein depicted being of the universal type to adapt it for connection to arms of different design. The particular arm illustrated is provided with a slot to receive the attaching fin 19. This fin defines, with the body of the clip, an opening 20 adapted to receive the attaching bolt of another type of arm, while for the hooked type of arm the clip is provided with spaced walls 21 and inturned abutments 22 which cooperate with the off-setting shoulder 23 of the fin 19 to provide an opening 24 to receive the upturned hook of such hooked type of arm.

During operation, the arm will reciprocate the wiper over the window surface and the blade will rotate in its bearing as formed by the anchor straps 15, thus causing the strap terminals at opposite sides of the rubber body 9 alternately to engage the latter to yieldingly press the wiping edge 12, 13 down onto the window glass. The blade assumes the proper angle of inclination at the beginning of each stroke from which position it may yield under increased pressure and resistance.

This construction affords an easy and smooth wiping action without scratching the glass, and while the inventive principles and concepts here disclosed are described in detail, the same are not to be restricted thereby since the same are capable of other physical embodiments.

What is claimed is:

1. A window wiper comprising a resilient wiping strip, a channeled holder embracing the strip within its channel, and an attaching clip pivotally mounted on the holder, said clip having a part engageable with a portion of said strip within the channeled holder through an opening in the latter for yieldably resisting pivotal movement of the clip on the holder.

2. A window wiper comprising a resilient wiping body, a holder having opposed sides embracing the body therebetween, and a mounting member pivoting on the holder and having opposed parts operable through openings in the holder for alternately engaging with the opposite sides of the body within the limits of the holder for yielding engagement therewith.

3. A window wiper comprising a resilient wiping body, a channeled holder receiving the body within its channel, the sides of the channel being provided with openings exposing the sides of said body, and an attaching clip rockably mounted on the holder and having opposed parts extending through the openings in the sides of the holder for yielding contact with a portion of the body lying within the channelled holder.

4. A window wiper comprising a resilient wiping body, a channeled holder receiving the body within its channel, the sides of the channel being provided with relatively offset openings exposing the body, and an attaching clip mounted on the holder for lateral rocking about an axis within the channel of the holder and having relatively offset parts alternately engageable with the body through said openings of the holder for yielding contact therewith.

5. A window wiper comprising a resilient wiping body, a channeled holder receiving the body within its channel, the sides of the channel being provided with openings exposing the body, and an attaching clip mounted on the holder for lateral rocking about an axis within the channel of the holder, said attaching clip having parts engaging in the openings of the holder for interlocking the clip against longitudinal movement on the holder, the free ends of said parts adapted to embed themselves into the resilient body for yieldably resisting lateral rocking of the clip.

6. A window wiper comprising a resilient wiping body, a channeled holder receiving the body within its channel, the sides of the channel being provided with openings exposing the sides of said body, and an attaching clip mounted on the holder for lateral rocking and having parts engaging in the openings of the holder for interlocking the clip against longitudinal movement on the holder, the free ends of said parts adapted to contact the resilient body for yieldably resisting lateral rocking of the clip, and shoulders on said engaging parts for abutting the sides of the holder in determining the extent of lateral rocking of the clip on the holder.

7. A window wiper comprising a resilient wiping body, a holder having opposed sides embracing the body therebetween, a mounting member pivoting on the holder and having engaging parts positioned to alternately press against opposite sides of the body in yielding engagement therewith, and shoulders upon said engaging parts for abutting the sides of the holder in determining the extent of lateral rocking of the mounting member on the holder.

8. A window wiper comprising a resilient wiping body, a channelled holder embracing said body within its channel, and having openings in its sides exposing the wiping body; an attaching clip pivotally mounted on the holder for lateral pivoting and having parts alternately engageable with the resilient body through the openings in the sides of the holder for yielding contact with said body, said parts engaging the walls of said openings to limit relative longitudinal movement between said clip and said holder.

9. A window wiper having a resilient wiping body, a holder engaging said body, and an attaching clip pivoted on said holder for pivotal movement about an axis parallel to the longitudinal plane thereof, opposed extremities on said attaching clip alternately engageable with the resilient wiping body and coacting with portions of the holder to prevent longitudinal movement.

10. A window wiper comprising a resilient wiping body, a holder having a beaded portion embracing said body, an attaching clip with semicircular portions extending around the beaded portion of the holder and having parts entering through openings in the sides of the holder to engage the wiping body which yieldably resists rotation of the clip about the beaded portion of the holder.

11. A window wiper comprising a resilient wiping strip, a channelled holder therefor, and a rockably mounted attaching clip inseparably attached to the holder to form a unitary wiper structure, said clip being yieldably resisted in its rocking motion by parts of said clip passing through said holder and engageable with portions of said wiping strip lying within the holder.

12. A window wiper having a resilient wiper body, a channelled holder receiving the wiper body and having openings in its sides exposing the wiper body, and an attaching clip mounted on the holder for pivoting laterally from a normal position and having members passing through the openings in the sides of the holder and alternately engageable with the wiping body, said members being so positioned that the resiliency of the wiping body tends to oppose the lateral movement of the clip and force it substantially to such normal position.

13. A window wiper having a resilient wiping body, a reinforcing member supporting the wiping body and having a substantially cylindrical top portion, and an attaching clip embracing said cylindrical portion for oscillating movement thereabout, said clip having parts engageable with said resilient body to be yieldably resisted thereby in its oscillation about the axis of said cylindrical portion.

14. A window wiper comprising a resilient strip, a holder having a substantially semi-circular bead portion rigidly embracing said strip, a clip mounted on said bead portion and movable about the axis thereof, and bead embracing means for securing said clip on said bead portion, said means being arranged to engage said strip adjacent said bead for yieldably constraining movement of said clip about the axis of said bead.

15. A window wiper comprising a resilient strip, a holder having a substantially semi-circular bead portion rigidly embracing said strip, a clip having bead embracing means securing said clip on said bead portion for relative lateral movement therebetween about an axis common to said bead portion and said embracing means, and means yieldably supporting the clip in a normal position.

ERWIN C. HORTON.